United States Patent
Kawaguchi

(10) Patent No.: US 7,313,642 B2
(45) Date of Patent: Dec. 25, 2007

(54) BUS BRIDGE ARBITRATION METHOD

(75) Inventor: Kenichi Kawaguchi, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 607 days.

(21) Appl. No.: 10/391,167

(22) Filed: Mar. 18, 2003

(65) Prior Publication Data

US 2003/0200375 A1   Oct. 23, 2003

(30) Foreign Application Priority Data

Mar. 20, 2002   (JP)   ............... 2002-077846

(51) Int. Cl.
*G06F 13/36* (2006.01)

(52) U.S. Cl. .................................... 710/309

(58) Field of Classification Search ................ 710/306, 710/309, 311, 313, 314, 315
See application file for complete search history.

(56) References Cited

U.S. PATENT DOCUMENTS 5,471,590 A * 11/1995 Melo et al. ................. 710/108
5,621,897 A    4/1997 Boury et al.
5,764,929 A *  6/1998 Kelley et al. ............... 710/107
6,148,359 A * 11/2000 Elkhoury et al. ........... 710/311
6,199,131 B1 * 3/2001 Melo et al. ................. 710/107
6,381,667 B1 * 4/2002 Brown ....................... 710/313
6,757,798 B2 * 6/2004 Tetrick ....................... 711/163

FOREIGN PATENT DOCUMENTS

| JP | 04-192056  | 7/1992  |
| JP | 8-297632   | 11/1996 |
| JP | 2002-073532 | 3/2002 |

* cited by examiner

*Primary Examiner*—Christopher E. Lee
*Assistant Examiner*—Trisha Vu

(57) ABSTRACT

A bus bridge is connected to a first bus and a second bus. In the bus bridge, an arbiter grants ownership of the first bus to one of a plurality of devices connected to the first bus. A detecting unit detects a read cycle initiated by the device on the first bus to read data from a memory which is also accessible by another device connected to the second bus. A first signaling unit sends a first signal to the arbiter, when the data is not yet transferable to the device when the read cycle is detected. A second signaling unit sends a second signal to the arbiter, when the data becomes transferable to the device. The arbiter deprives the device of the ownership of the first bus upon receipt of the first signal, and withholds from granting the ownership to the device until receipt of the second signal.

5 Claims, 11 Drawing Sheets

FIG.7

| BUS MASTER | TRANSFER COMPLETION INFORMATION | RETRY INFORMATION | MEMORY ACCESS INFORMATION |
|---|---|---|---|
| BUS MASTER 108 | 0 | 1 | 1 |
| BUS MASTER 109 | 0 | 0 | 0 |

BUS BRIDGE ARBITRATION METHOD

This application is based on an application No. 2002-077846 filed in Japan, the contents of which are hereby incorporated by reference.

BACKGROUND OF THE INVENTION

1. Field of the Invention

The present invention relates to a bus bridge that relays data between two buses, and in particular relates to a method of arbitrating for ownership of a bus in delayed transactions.

2. Prior Art

A computer system is constituted by a variety of devices including a CPU (Central Processing Unit). In general, these devices are connected to data transfer routes called buses. This being so, bus bridges are typically employed to establish data transfers between buses of different standards and to expand buses. These bus bridges enable a computer system with a plurality of buses to be implemented.

A conventional bus bridge is explained below, by referring to FIG. 11.

(Construction)

FIG. 11 shows a construction of a conventional bus bridge 3, together with two buses 1 and 2 that are connected to the bus bridge 3.

The bus 1 is a VL-Bus (VESA (Video Electronics Standards Association) Local Bus). A CPU 12 and a memory 13 are connected to the bus 1.

The bus 2 is a PCI (Peripheral Component Interconnect) bus. A bus master 8, a bus master 9, and a target 10 are connected to the bus 2. A bus master referred to here is a device that can request ownership (i.e., right of use) of a bus from an arbiter. When the arbiter grants the request, the bus master initiates a bus cycle on the bus to communicate with a target device.

The bus bridge 3 performs delayed transactions in relaying data between the buses 1 and 2. A delayed transaction is a transaction in which a bus bridge issues a retry to a bus cycle initiated on a bus by a bus master rather than completing it immediately, so as to free the bus for other transactions until it becomes ready to provide read data to the bus master or accept write data from the bus master. A specific operation of such a delayed transaction is explained in greater detail later.

The bus bridge 3 is roughly made up of a bus interface 4, a bus interface 5, a buffer 6, and an arbiter 7. An arbiter 11 is connected with the bus bridge 3.

The bus interface 4 operates as an interface to the bus 1.
The bus interface 5 operates as an interface to the bus 2.
The buffer 6 is a memory for temporarily storing read data in delayed transactions.

The arbiter 7 has a function of arbitrating for ownership of the bus 2. The arbiter 7 is connected with the bus master 8 via a request signal line 14 and a grant signal line 15. The arbiter 7 is also connected with the bus master 9 via a request signal line 16 and a grant signal line 17. The arbiter 7 is further connected with the bus interface 5 via a request signal line 18 and a grant signal line 19, within the bus bridge 3. This being so, among the devices connected to the bus 2, the bus master 8, the bus master 9, and the bus interface 5 that are connected with the arbiter 7 can request ownership of the bus 2.

Here, a bus master or a bus interface asserts its request signal line to request ownership of the bus 2, and deasserts the request signal line to withdraw the request.

When two or more devices simultaneously request ownership of the bus 2, the arbiter 7 grants ownership to a device with a highest level of arbitration priority, based on a round-robin priority scheme. Here, the arbiter 7 grants ownership to the device by asserting its grant signal line.

Upon detecting the assertion of the grant signal line, the device acknowledges that ownership has been granted. Hence the device occupies the bus 2 and initiates a bus cycle.

Even if no device requests ownership of the bus 2, the arbiter 7 grants ownership to one of the devices connected to the bus 2 to keep the bus 2 driven, so as to prevent floating of the bus 2. This is called bus parking. Usually, the last device that occupied the bus 2 performs bus parking.

The arbiter 11 has a function of arbitrating for ownership of the bus 1. The arbiter 11 uses the same priority scheme as the arbiter 7. The arbiter 11 is connected with the CPU 12 via a request signal line 22 and a grant signal line 23. The arbiter 11 is also connected with the bus interface 4 via a request signal line 20 and a grant signal line 21. This being so, among the devices connected to the bus 1, the CPU 12 and the bus interface 4 that are connected with the arbiter 11 can request ownership of the bus 1.

(Delayed Transaction)

A delayed transaction performed by the bus bridge 3 is explained below, using an example when the bus master 8 reads data stored in the memory 13.

First, the bus master 8 requests ownership of the bus 2 by asserting the request signal line 14.

Upon detecting the assertion of the request signal line 14, the arbiter 7 performs arbitration. If the arbiter 7 determines the bus master 8 as the owner of the bus 2 as a result of the arbitration, the arbiter 7 asserts the grant signal line 15.

Upon detecting the assertion of the grant signal line 15, the bus master 8 initiates a read cycle to read data stored in the memory 13, on the bus 2.

The bus interface 5 detects an address of the data to be read, during an address phase of the read cycle. The bus interface 5 issues a retry during a data phase of the read cycle. The bus interface 5 also requests the bus interface 4 to initiate a read cycle on the bus 1 to read the data from the detected address.

The bus master 8 receives the retry during the data phase of the read cycle, and responsively deasserts the request signal line 14.

At this time, if another bus master connected to the bus 2 is requesting ownership of the bus 2 by asserting its request signal line, the arbiter 7 deasserts the grant signal line 15 of the bus master 8 and asserts a grant signal line of the other bus master.

If no bus master is requesting ownership of the bus 2, on the other hand, the arbiter 7 keeps the grant signal line 15 of the bus master 8 asserted.

Upon receiving the request to initiate the read cycle from the bus interface 5, the bus interface 4 asserts the request signal line 20. If the arbiter 11 asserts the grant signal line 21 in response, that is, if the arbiter 11 grants ownership of the bus 1 to the bus interface 4, the bus interface 4 immediately initiates the read cycle on the bus 1 to read the data from the memory 13. The read data is stored into the buffer 6.

The bus master 8 reasserts the request signal line 14, a predetermined period after the receipt of the retry. The arbiter 7 responsively performs arbitration. If the arbiter 7 determines the bus master 8 as the owner of the bus 2 as a result of the arbitration, the arbiter 7 asserts the grant signal line 15. Upon detecting the assertion of the grant signal line 15, the bus master 8 reinitiates a read cycle that is the same as before, on the bus 2.

The bus interface 5 detects the read cycle reinitiated by the bus master 8 on the bus 2, and transfers the data stored in the buffer 6 to the bus master 8 via the bus 2 during a data phase of the read cycle.

This is a typical delayed transaction.

In the above delayed transaction, the conventional bus bridge 3 may encounter the following problems.

The bus master 8 reasserts the request signal line 14 the predetermined period after receiving the retry. As a result of arbitration, however, the arbiter 7 may not immediately grant ownership to the bus master 8 but instead grant ownership to another bus master.

Also, even if the arbiter 7 immediately grants ownership to the bus master 8 and the bus master 8 reinitiates the read cycle on the bus 2, the data may not yet be stored in the buffer 6. This occurs when, for instance, a device connected to the bus 1 is occupying the bus 1 and therefore the bus interface 4 cannot obtain ownership of the bus 1 to read the data from the memory 13.

If the data is not stored in the buffer 6, the bus interface 5 issues a retry to the bus master 8 again. Thus, a premature reattempt to read the data by the bus master 8 may be repeated until the data is stored into the buffer 6. This causes significant inefficiency, as another bus master seeking access to the bus 2 cannot use the bus 2 during such vain read cycles performed by the bus master 8.

This problem may be overcome by a delay transaction arbitration technique disclosed in U.S. Pat. No. 6,199,131. According to this technique, an arbiter performs arbitration in the following manner. If a delayed read transaction of a bus master is pending, i.e., if the bus master receives a retry, the arbiter lowers a level of arbitration priority provided to that bus master. Once the delayed read transaction is completed, the arbiter raises the arbitration priority of the bus master to a highest level.

In this way, a bus master which receives a retry in a delayed read transaction is kept from repeatedly reinitiating a read cycle vainly. Also, the bus master can read desired data smoothly.

However, just lowering the level of arbitration priority of the bus master receiving the retry does not completely prevent the occurrence of a vain read cycle. If no other device is requesting ownership when the bus master requests ownership the predetermined period after receiving the retry, the arbiter does not have any choice other than that bus master in determining the owner of the bus. Accordingly, the arbiter grants ownership to the bus master, even when the data is not yet available. This causes the bus master to reinitiate a read cycle in vain.

Besides, if another device requests ownership one clock after the request of the bus master in this circumstance, that device has to wait until the vain read cycle of the bus master ends.

Also, the arbiter raises the arbitration priority of the bus master to the highest level once the data has become available. However, if another device is occupying the bus at this time, the bus master has to wait until that device releases the bus.

SUMMARY OF THE INVENTION

In view of the problems described above, the present invention has an object of providing a bus bridge that improves the bus transfer efficiency by preventing the occurrence of a vain read cycle through the use of a novel technique.

The stated object can be achieved by a bus bridge that is connected to a first bus and a second bus, including: an arbiter operable to grant ownership of the first bus to one of a plurality of devices connected to the first bus; a detecting unit operable to detect a read cycle initiated by the device on the first bus, the read cycle being a cycle to read data stored in a memory which can also be accessed by another device connected to the second bus; a first signaling unit operable to send a first signal to the arbiter, when the data is not yet transferable to the device at a time when the read cycle is detected; and a second signaling unit operable to send a second signal to the arbiter, when the data becomes transferable to the device, wherein the arbiter deprives the device of the ownership of the first bus upon receipt of the first signal, and withholds from granting the ownership of the first bus to the device until receipt of the second signal.

According to this construction, the arbiter does not grant ownership of the first bus to the device which initiated the read cycle, until the data becomes transferable to the device. This keeps the device from reinitiating a read cycle in vain. Hence the transfer efficiency of the first bus can be improved.

Here, the bus bridge may further include: a third signaling unit operable to send a third signal to the arbiter, when the transfer of the data to the device is completed, wherein the arbiter grants the ownership of the first bus to the device upon the receipt of the second signal, and maintains the ownership of the first bus by the device until receipt of the third signal.

According to this construction, the arbiter maintains the ownership of the first bus by the device from when the data becomes transferable to the device until when the transfer of the data to the device is completed. This allows a delayed transaction to be carried out speedily. Hence the transfer efficiency of the first bus can be improved.

Here, the detecting unit may include: a judging unit operable to judge whether the memory which stores the data to be read is a local memory that is locally connected with the bus bridge, wherein the first signaling unit sends the first signal to the arbiter, when the judging unit judges in the affirmative and the data is not yet transferable to the device.

According to this construction, when a delayed transaction is performed to read the data stored in the local memory locally connected with the bus bridge, the occurrence of a vain read cycle is prevented. This benefits the transfer efficiency of the first bus.

Here, the bus bridge may further include: a buffer operable to temporarily store the data read from the local memory, wherein the second signaling unit sends the second signal to the arbiter, once the data is stored into the buffer.

Here, the arbiter may include: a storing unit operable to store status information of each device that is connected to the first bus and can request the ownership of the first bus, wherein the arbiter (a) sets a first flag in status information of the device initiating the read cycle and deprives the device of the ownership of the first bus, upon the receipt of the first signal, (b) withholds from granting the ownership of the first bus to the device until the receipt of the second signal, (c) sets a second flag in the status information of the device, and grants the ownership of the first bus to the device, upon the receipt of the second signal, and (d) maintains the ownership of the first bus by the device until the receipt of the third signal.

Here, the bus bridge may further include: a first bus interface operable to act as an interface to the first bus; and a second bus interface operable to act as an interface to the second bus, wherein the arbiter and the first bus interface are connected via a first signal line and a third signal line, the arbiter and the second bus interface are connected via a second signal line, the first signaling unit is included in the first bus interface, and sends the first signal to the arbiter by asserting the first signal line, the second signaling unit is included in the second bus interface, and sends the second signal to the arbiter by asserting the second signal line, and the third signaling unit is included in the first bus interface, and sends the third signal to the arbiter by asserting the third signal line.

Here, the arbiter may include: a storing unit operable to store status information of each device that is connected to the first bus and can request the ownership of the first bus, wherein the arbiter (a) sets a first flag in status information of the device initiating the read cycle and deprives the device of the ownership of the first bus, upon the receipt of the first signal, and (b) withholds from granting the ownership of the first bus to the device until the receipt of the second signal.

Here, the bus bridge may further include: a first bus interface operable to act as an interface to the first bus; and a second bus interface operable to act as an interface to the second bus, wherein the arbiter and the first bus interface are connected via a first signal line, the arbiter and the second bus interface are connected via a second signal line, the first signaling unit is included in the first bus interface, and sends the first signal to the arbiter by asserting the first signal line, and the second signaling unit is included in the second bus interface, and sends the second signal to the arbiter by asserting the second signal line.

The stated object can also be achieved by a computer system including: a first bus to which a plurality of devices are connected; a second bus to which a memory is connected; an arbiter operable to grant ownership of the first bus to one of the plurality of devices; and a bus bridge which is connected to the first bus and the second bus, wherein the bus bridge includes: a detecting unit operable to detect a read cycle initiated by the device on the first bus, the read cycle being a cycle to read data stored in the memory; a first signaling unit operable to send a first signal to the arbiter, when the data is not yet transferable to the device at a time when the read cycle is detected; and a second signaling unit operable to send a second signal to the arbiter, when the data becomes transferable to the device, wherein the arbiter deprives the device of the ownership of the first bus upon receipt of the first signal, and withholds from granting the ownership of the first bus to the device until receipt of the second signal.

Here, the bus bridge may further include: a third signaling unit operable to send a third signal to the arbiter, when the transfer of the data to the device is completed, wherein the arbiter grants the ownership of the first bus to the device upon the receipt of the second signal, and maintains the ownership of the first bus by the device until receipt of the third signal.

The stated object can also be achieved by an arbitration method for use in an arbiter that grants ownership of a bus to one of a plurality of devices connected to the bus, including: a step of depriving the device of the ownership of the bus, when the device, having been granted the ownership of the bus, initiates a read cycle on the bus to read data but the data is not yet transferable to the device; and a step of withholding from granting the ownership of the bus to the device until the data becomes transferable to the device.

Here, the arbitration method may further include: a step of granting the ownership of the bus to the device, when the data becomes transferable to the device; and a step of maintaining the ownership of the bus by the device until the transfer of the data to the device is completed.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 shows an example of access information in the second embodiment;

DESCRIPTION OF THE PREFERRED EMBODIMENTS

The following describes embodiments of a bus bridge of the present invention in conjunction with the drawings.

First Embodiment (Construction)

Figure 1:
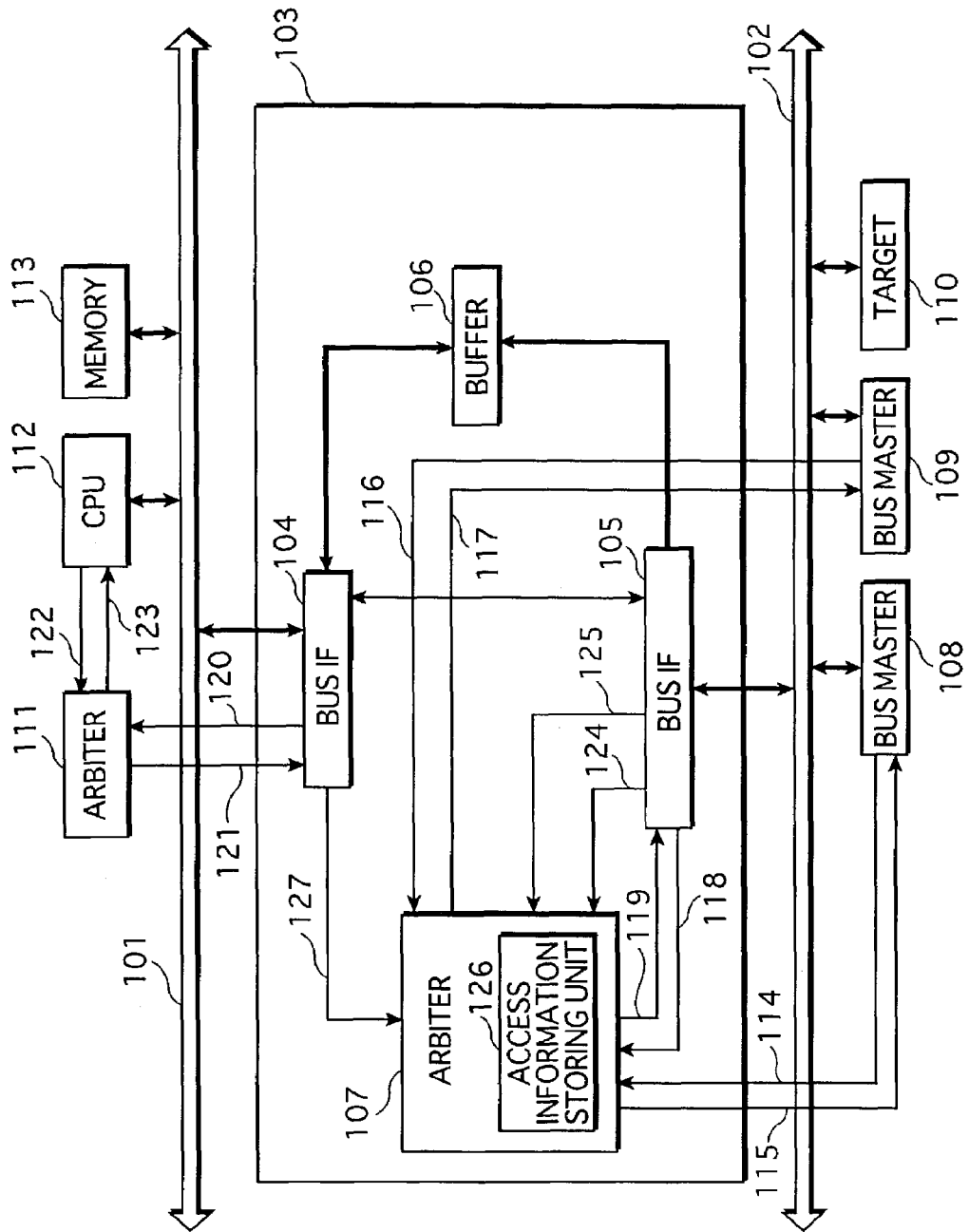
FIG. 1 shows a construction of a bus bridge to which the first embodiment of the invention relates, together with two buses that are connected with the bus bridge.

FIG. 1 shows a construction of a bus bridge 103 to which the first embodiment of the invention relates, together with two buses 101 and 102 that are connected with the bus bridge 103.

The bus 101 is a VL-Bus. A CPU 112 and a memory 113 are connected to the bus 101.

The bus 102 is a PCI bus. A bus master 108, a bus master 109, and a target 110 are connected to the bus 102.

The bus bridge 103 is roughly made up of a bus interface 104, a bus interface 105, a buffer 106, and an arbiter 107. The arbiter 107 includes an access information storing unit 126. Also, an arbiter 111 is connected with the bus bridge 103.

The bus interface 104 operates as an interface to the bus 101. In detail, the bus interface 104 detects a bus cycle which is initiated by the CPU 112 on the bus 101. If the bus cycle is a cycle to access a device connected to the bus 102, the bus interface 104 requests the bus interface 105 to initiate a bus cycle on the bus 102. Also, the bus interface 104 initiates a bus cycle on the bus 101 when requested by the bus interface 105. If that bus cycle is a read cycle, the bus interface 104 asserts a transfer completion signal line 127 which is connected to the arbiter 107, when the read cycle ends.

The bus interface 105 operates as an interface to the bus 102. In detail, the bus interface 105 detects a bus cycle which is initiated by the bus master 108 or 109 on the bus 102. If the bus cycle is a cycle to access a device connected to the bus 101, the bus interface 105 requests the bus interface 104 to initiate a bus cycle on the bus 101. Furthermore, if the bus cycle is a read cycle to read data from a device connected to the bus 101, the bus interface 105 issues a retry during a data phase of the read cycle. Also, the bus interface 105 initiates a bus cycle on the bus 102 when requested by the bus interface 104.

Here, each of the bus masters 108 and 109 has a timer. This being so, the bus master which received the retry requests ownership of the bus 102 again, when a predetermined period has passed since the receipt of the retry.

The buffer 106 is a memory for temporarily storing read data in delayed transactions.

The arbiter 107 has a function of arbitrating for ownership of the bus 102, and a function of managing access information stored in the access information storing unit 126. The arbiter 107 performs arbitration based on this access information. Arbitration performed by the arbiter 107 is explained in detail later.

The arbiter 107 is connected with the bus master 108 via a request signal line 114 and a grant signal line 115. The arbiter 107 is also connected with the bus master 109 via a request signal line 116 and a grant signal line 117. The arbiter 107 is further connected with the bus interface 105 via a request signal line 118, a grant signal line 119, a retry response signal line 124, and a normal response signal line 125, within the bus bridge 103.

This being so, among the devices connected to the bus 102, the bus master 108, the bus master 109, and the bus interface 105 that are connected with the arbiter 107 can request ownership of the bus 102.

Here, a bus master or a bus interface requests ownership of the bus 102 by asserting its request signal line, and withdraws the request by deasserting the request signal line.

The arbiter 111 has a function of arbitrating for ownership of the bus 101. This arbiter 111 is the same as a conventional arbiter. The arbiter 111 is connected with the CPU 112 via a request signal line 122 and a grant signal line 123. The arbiter 111 is also connected with the bus interface 104 via a request signal line 120 and a grant signal line 121. This being so, among the devices connected to the bus 101, the CPU 112 and the bus interface 104 that are connected with the arbiter 111 can request ownership of the bus 101.

(Access Information)

Figure 2:
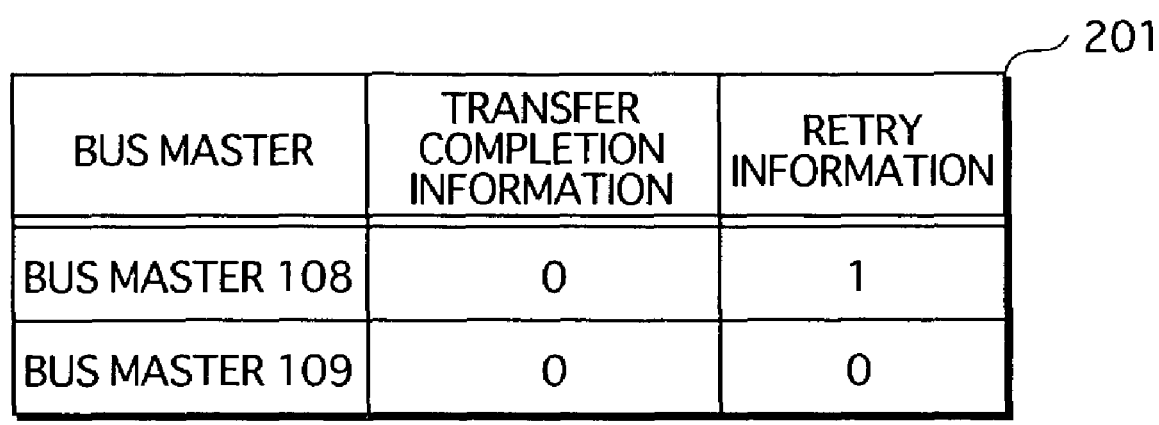
FIG. 2 shows an example of access information in the first embodiment.

FIG. 2 shows a specific example of access information stored in the access information storing unit 126.

In the drawing, access information 201 is provided for each bus master connected to the bus 102 (i.e., the bus masters 108 and 109), and includes retry information and transfer completion information.

Retry information shows whether a retry was issued. Upon detecting that the retry response signal line 124 is asserted, the arbiter 107 sets retry information of a bus master occupying the bus 102, to "1".

Transfer completion information shows whether requested data was stored into the buffer 106. Upon detecting that the transfer completion signal line 127 is asserted, the arbiter 107 sets transfer completion information of a bus master to "1" if the master's retry information is "1".

(Arbitration)

Figure 3:
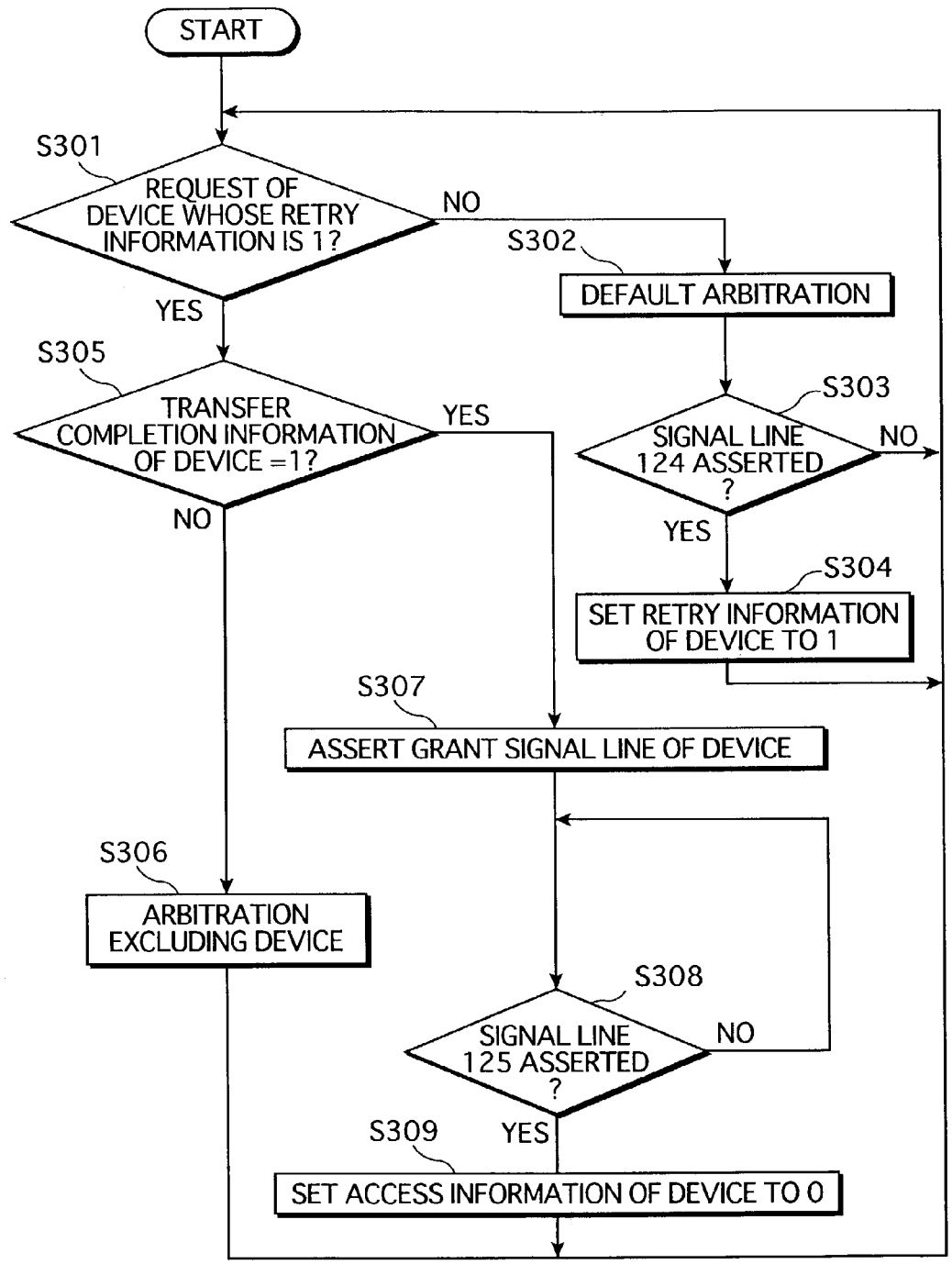
FIG. 3 is a flowchart showing arbitration performed by an arbiter in the first embodiment.

FIG. 3 is a flowchart showing arbitration performed by the arbiter 107 in the first embodiment.

Upon detecting that a request signal line of a device connected to the bus 102 is asserted, the arbiter 107 refers to the access information in the access information storing unit 126 to judge whether the retry information of the device is "1" (S301).

If the retry information of the device is not "1" (S301: NO), the arbiter 107 performs default arbitration (S302). Default arbitration is an arbitration operation that determines a device with a highest level of arbitration priority as the owner of the bus 102 based on a round-robin priority scheme.

If the arbiter 107 determines the device as the owner of the bus 102 as a result of the default arbitration, the arbiter 107 asserts a grant signal line of the device.

Following this, upon detecting that the retry response signal line 124 is asserted (S303:YES), the arbiter 107 sets the retry information of the device occupying the bus 102 to "1" (S304), and deasserts the grant signal line of the device. In other words, the arbiter 107 deprives the device of ownership of the bus 102. The arbiter 107 then returns to step S301.

In step S303, if the retry response signal line 124 is not asserted (S303:NO), the arbiter 107 returns to step S301.

In step S301, if the retry information of the device is "1" (S301:YES), the arbiter 107 further refers to the access information in the access information storing unit 126 to judge whether the transfer completion information of the device is "1" (S305).

If the transfer completion information of the device is not "1" (S305:NO), the arbiter 107 performs arbitration excluding the device (S306). Which is to say, the arbiter 107 does not grant ownership of the bus 102 to the device. The arbiter 107 then returns to step S301.

If the transfer completion information of the device is "1" (S305:YES), on the other hand, the arbiter 107 asserts the grant signal line of the device (S307).

Following this, upon detecting that the normal response signal line 125 is asserted (S308:YES), the arbiter 107 sets the retry information and transfer completion information of the device to "0" (S309). The arbiter 107 then returns to step S301.

(Specific Example of Delayed Transaction)

A specific example of a delayed transaction performed through the bus bridge 103 is explained below.

Figure 4:
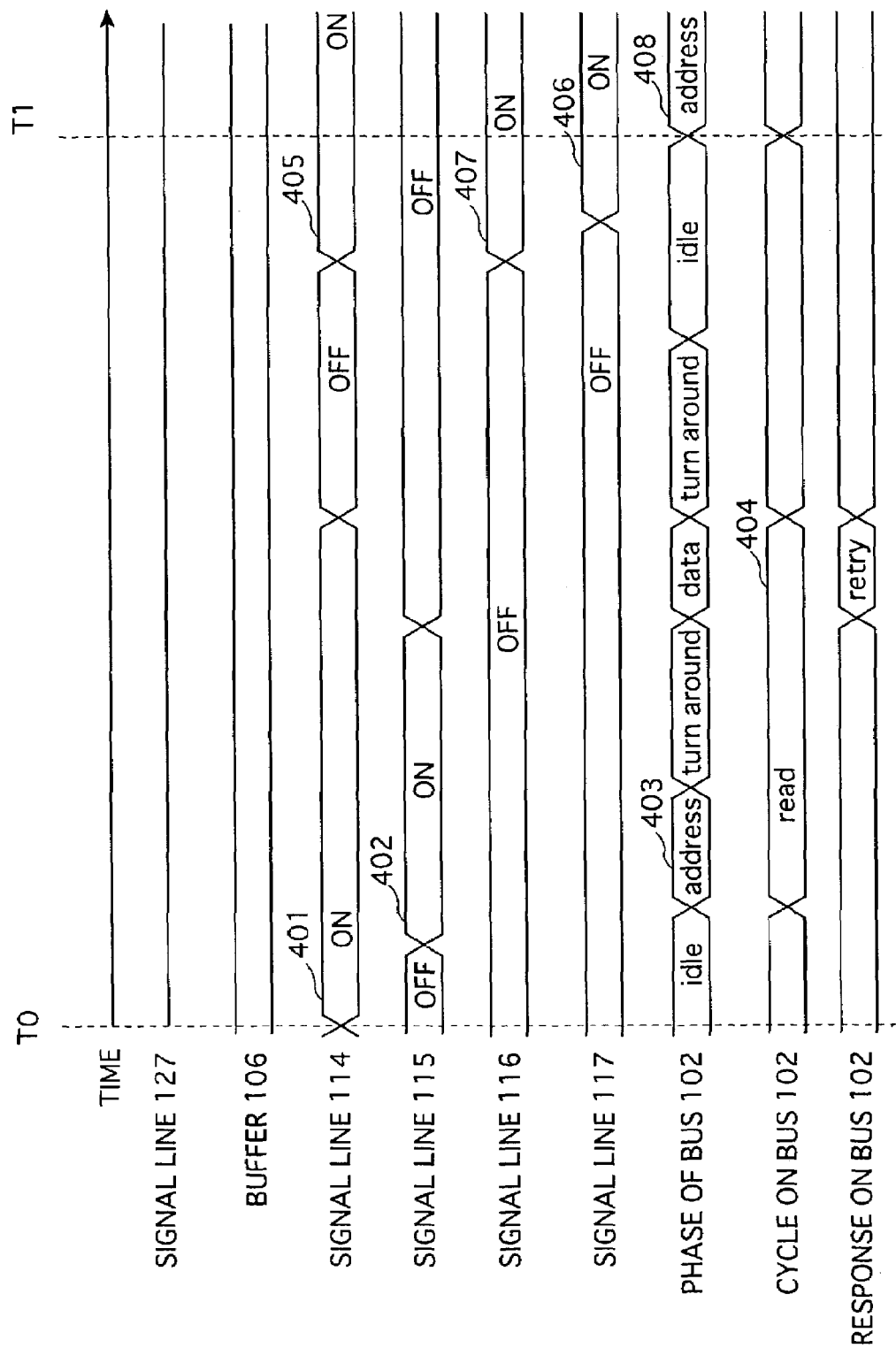
FIGS. 4 and 5 are a time chart of a transaction in which a bus master 108 reads data from a memory 113 in FIG. 1.
Figure 5:
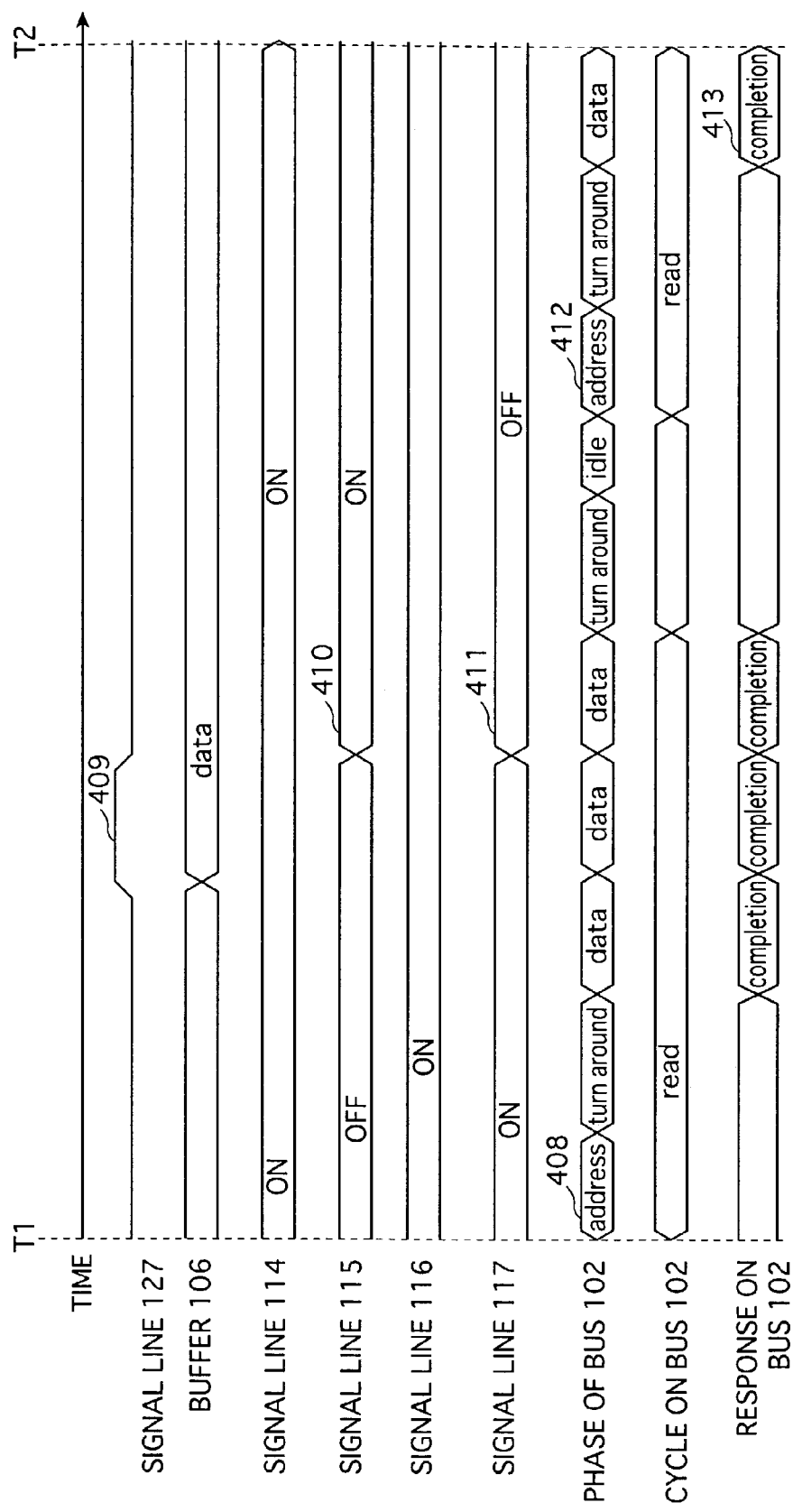

FIGS. 4 and 5 are a time chart of a delayed transaction in which the bus master 108 connected to the bus 102 reads data from the memory 113 connected to the bus 101. FIG. 4 shows time T0 to time T1, whereas FIG. 5 shows time T1 to time T2.

It is noted here that the request signal line 114 and the grant signal line 115 are connected with the bus master 108, whilst the request signal line 116 and the grant signal line 117 are connected with the bus master 109 .

First, the bus master 108 asserts the request signal line 114 to request ownership of the bus 102 (401).

Upon detecting the assertion of the request signal line 114, the arbiter 107 performs arbitration.

Since there is no asserted request signal line other than the request signal line 114, the arbiter 107 asserts the grant signal line 115 to grant ownership of the bus 102 to the bus master 108 (402).

Upon detecting the assertion of the grant signal line 115, the bus master 108 initiates a read cycle on the bus 102. The bus interface 105 detects an address of data to be read, during an address phase of the read cycle (403).

The bus interface 105 requests the bus interface 104 to initiate a read cycle to read the data from the detected address. The bus interface 105 also asserts the retry response signal line 124 to notify the arbiter 107 of issuance of a retry, and issues the retry during a data phase of the read cycle.

Upon detecting the assertion of the retry response signal line 124, the arbiter 107 sets the retry information of the bus master 108 occupying the bus 102 to "1", and deasserts the grant signal line 115. After this, the arbiter 107 grants ownership of the bus 102 to the bus interface 105. The bus interface 105 performs bus parking.

Meanwhile, upon receiving the retry during the data phase of the read cycle, the bus master 108 deasserts the request signal line 114 to terminate the read cycle (404).

After a predetermined period, the bus masters 108 and 109 respectively assert the request signal lines 114 and 116 simultaneously (405 and 407). Upon detecting this, the arbiter 107 performs arbitration.

The arbiter 107 refers to the access information in the access information storing unit 126, and judges that the retry information of the bus master 108 is "1" and the transfer completion information of the bus master 108 is "0". Accordingly, the arbiter 107 determines a device other than the bus master 108, i.e., the bus master 109, as the owner of the bus 102, and asserts the grant signal line 117 (406).

Upon detecting the assertion of the grant signal line 117, the bus master 109 initiates a read cycle on the bus 102 to read data from the target 110 (408).

This read cycle is a burst transfer in which a number of pieces of data are transferred as one group by one addressing operation.

Meanwhile, the bus interface 104 initiates the read cycle on the bus 101 to read the data from the memory 113 as requested by the bus interface 105, and stores the read data into the buffer 106. The bus interface 104 then asserts the transfer completion signal line 127 (409). Upon detecting the assertion of the transfer completion signal line 127, the arbiter 107 sets the transfer completion information of the bus master 108 to "1", if the master's retry information is "1". The arbiter 107 then asserts the grant signal line 115, to grant ownership of the bus 102 to the bus master 108 (410).

At the same time, the arbiter 107 deasserts the grant signal line 117 of the bus master 109 (411). Having been deprived of ownership of the bus 102, the bus master 109 terminates the read cycle after one clock of data transfer.

Meanwhile, having been granted ownership of the bus 102, the bus master 108 reinitiates the same read cycle as before on the bus 102. The bus interface 105 detects the address of the data to be read, during an address phase of the read cycle (412).

The bus interface 105 drives the data stored in the buffer 106 onto the bus 102 during a data phase of the read cycle (413), and asserts the normal response signal line 125.

Second Embodiment

The second embodiment of the present invention concerns the case where a bus bridge is connected with a memory via a local bus. Note that the following explanation focuses on the differences from the first embodiment, while omitting the same features as those of the first embodiment.

(Construction)

Figure 6:
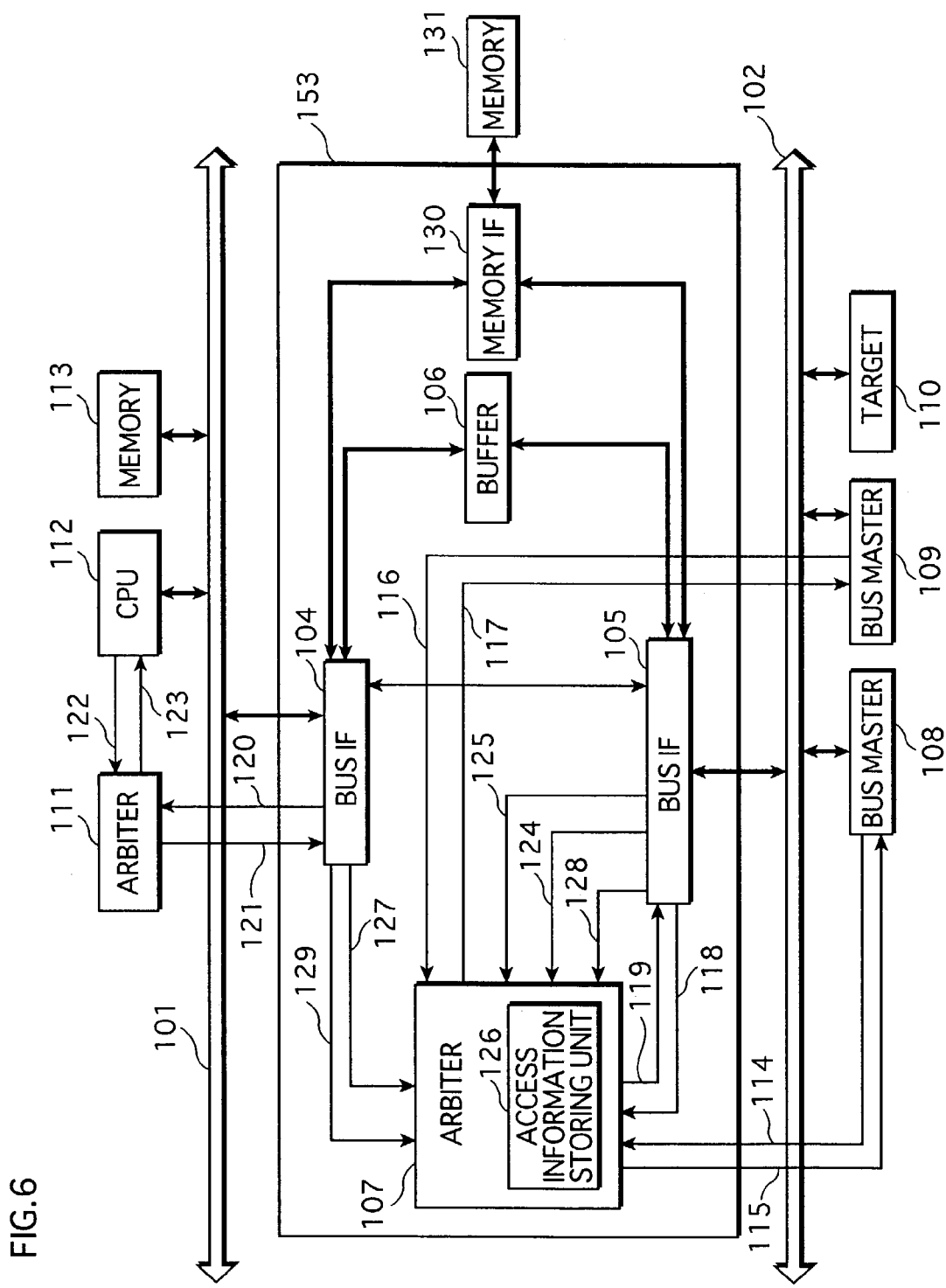
FIG. 6 shows a construction of a bus bridge to which the second embodiment of the invention relates, together with a local memory and two buses that are connected with the bus bridge.

FIG. 6 shows a construction of a bus bridge 153 to which the second embodiment relates, together with a local memory 131 and the two buses 101 and 102 that are connected with the bus bridge 153.

The bus bridge 153 and the memory 131 are connected via a VL-Bus.

The bus bridge 153 includes a memory interface 130, in addition to the construction elements of the bus bridge 103 of the first embodiment. The construction elements other than the memory interface 130, the bus interface 104, the bus interface 105, and the arbiter 107 have the same functions as the corresponding construction elements of the bus bridge 103.

The memory interface 130 receives a request to initiate a read cycle to read data from the memory 131 from the bus interface 104 or 105, and initiates the read cycle accordingly.

The bus interfaces 104 and 105 each have the following functions in addition to those described in the first embodiment. Which is to say, the bus interface judges whether a bus cycle initiated on a bus is to access the memory 131, during an address phase of the bus cycle. If the bus cycle is to access the memory 131 and a delayed transaction is required, the bus interface asserts a memory access signal line. Here, the bus interface 104 is connected with the arbiter 107 via a memory access signal line 129, whereas the bus interface 105 is connected with the arbiter 107 via a memory access signal line 128.

(Access Information)

FIG. 7 shows a specific example of access information stored in the access information storing unit 126 in the second embodiment.

In the drawing, access information 701 is provided for each bus master connected to the bus 102 (i.e., the bus masters 108 and 109), and includes transfer completion information, retry information, and memory access information.

Retry information and transfer completion information are as explained in the first embodiment.

Memory access information shows whether a bus cycle initiated by a bus master on the bus 102 is to access the memory 131. If the bus cycle is a read cycle to read data from the memory 131 and a delayed transaction is required, the bus interface 105 asserts the memory access signal line 128. Upon detecting the assertion of the memory access signal line 128, the arbiter 107 sets the memory access information of the bus master occupying the bus 102, to "1".

(Arbitration)

Figure 8:
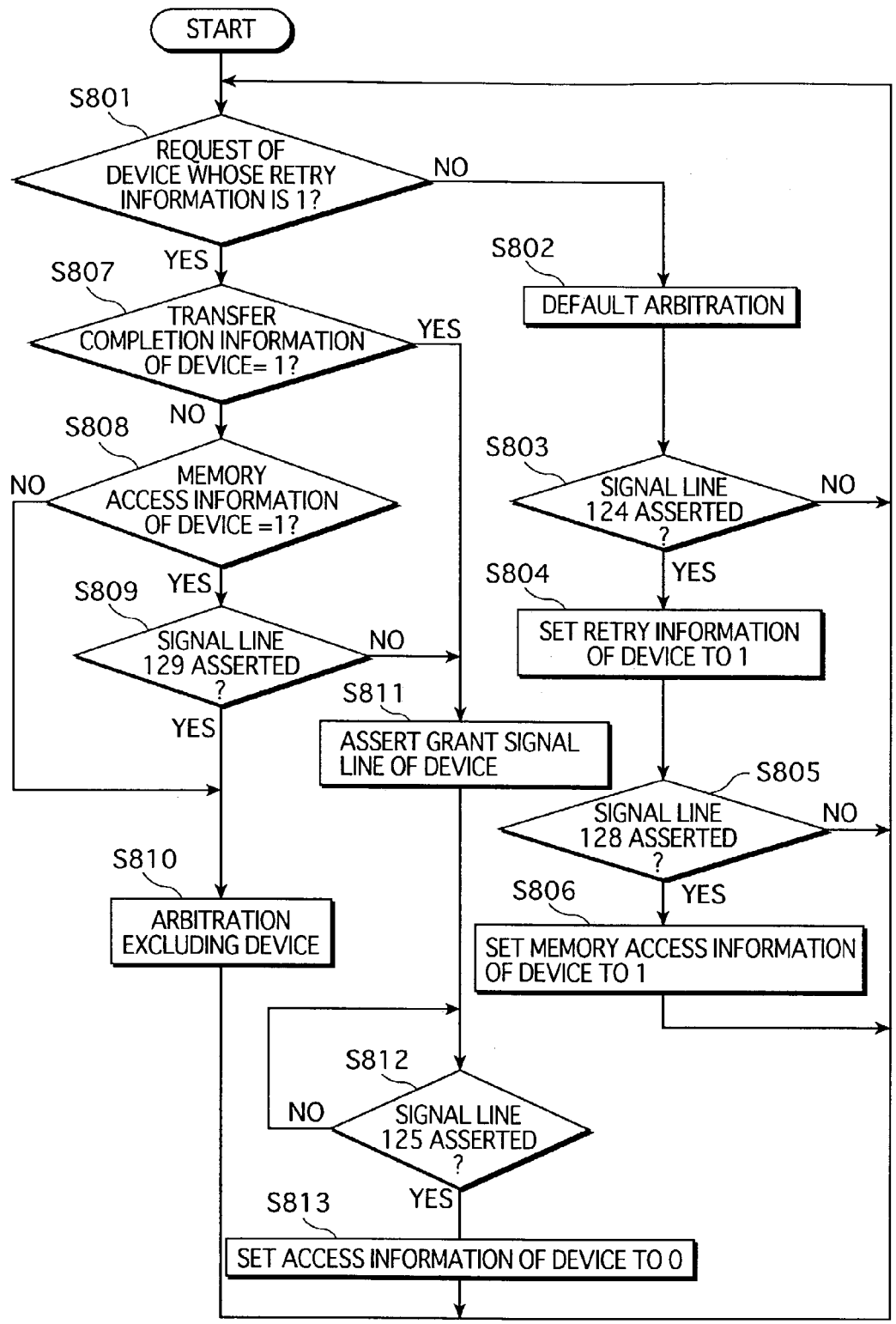
FIG. 8 is a flowchart showing arbitration performed by an arbiter in the second embodiment.

FIG. 8 is a flowchart showing arbitration performed by the arbiter 107 in the second embodiment.

Upon detecting that a request signal line of a device connected to the bus 102 is asserted, the arbiter 107 refers to the access information in the access information storing unit 126 to judge whether the retry information of the device is "1" (S801).

If the retry information of the device is not "1" (S801: NO), the arbiter 107 performs default arbitration (S802). Default arbitration is an arbitration operation that determines a device with a highest level of arbitration priority as the owner of the bus 102 based on a round-robin priority scheme.

If the arbiter 107 determines to grant ownership of the bus 102 to the device as a result of the default arbitration, the arbiter 107 asserts a grant signal line of the device.

After this, upon detecting that the retry response signal line 124 is asserted (S803:YES), the arbiter 107 sets the retry information of the device occupying the bus 102 to "1" (S804), and deasserts the grant signal line of the device. Thus, the arbiter 107 deprives the device of ownership of the bus 102. The arbiter 107 then advances to step S805.

Upon detecting that the memory access signal line 128 is asserted (S805:YES), the arbiter 107 sets the memory access information of the device, whose retry information is "1", to "1" (S806). The arbiter 107 then returns to step S801.

In step S803, if the retry response signal line 124 is not asserted (S803:NO), the arbiter 107,returns to step S801.

In step S801, if the retry information of the device is "1" (S801:YES), the arbiter 107 further refers to the access information in the access information storing unit 126 to judge whether the transfer completion information of the device is "1" (S807).

If the transfer completion information of the device is not "1" (S807:NO), the arbiter 107 advances to step S808. If the transfer completion information of the device is "1" (S807:YES), on the other hand, the arbiter 107 advances to step S811.

In step S808, the arbiter 107 judges whether the memory access information of the device is "1". If so (S808:YES), the arbiter 107 advances to step S809. Otherwise (S808:NO), the arbiter 107 advances to step S810.

In step S809, upon detecting that the memory access signal line 129 is asserted (S809:YES), the arbiter 107 advances to step S810. Otherwise (S809:NO), the arbiter 107 advances to step S811.

In step S810, the arbiter 107 performs arbitration excluding the device. In other words, the arbiter 107 does not grant ownership of the bus 102 to the device.

In step S811, the arbiter 107 asserts the grant signal line of the device.

Following this, upon detecting that the normal response signal line 125 is asserted (S812:YES), the arbiter 107 sets the retry information, transfer completion information, and memory access information of the device to "0" (S813). The arbiter 107 then returns to step S801.

(Specific Example of Delayed Transaction)

A specific example of a delayed transaction performed by the bus bridge 153 is given below.

Figure 9:
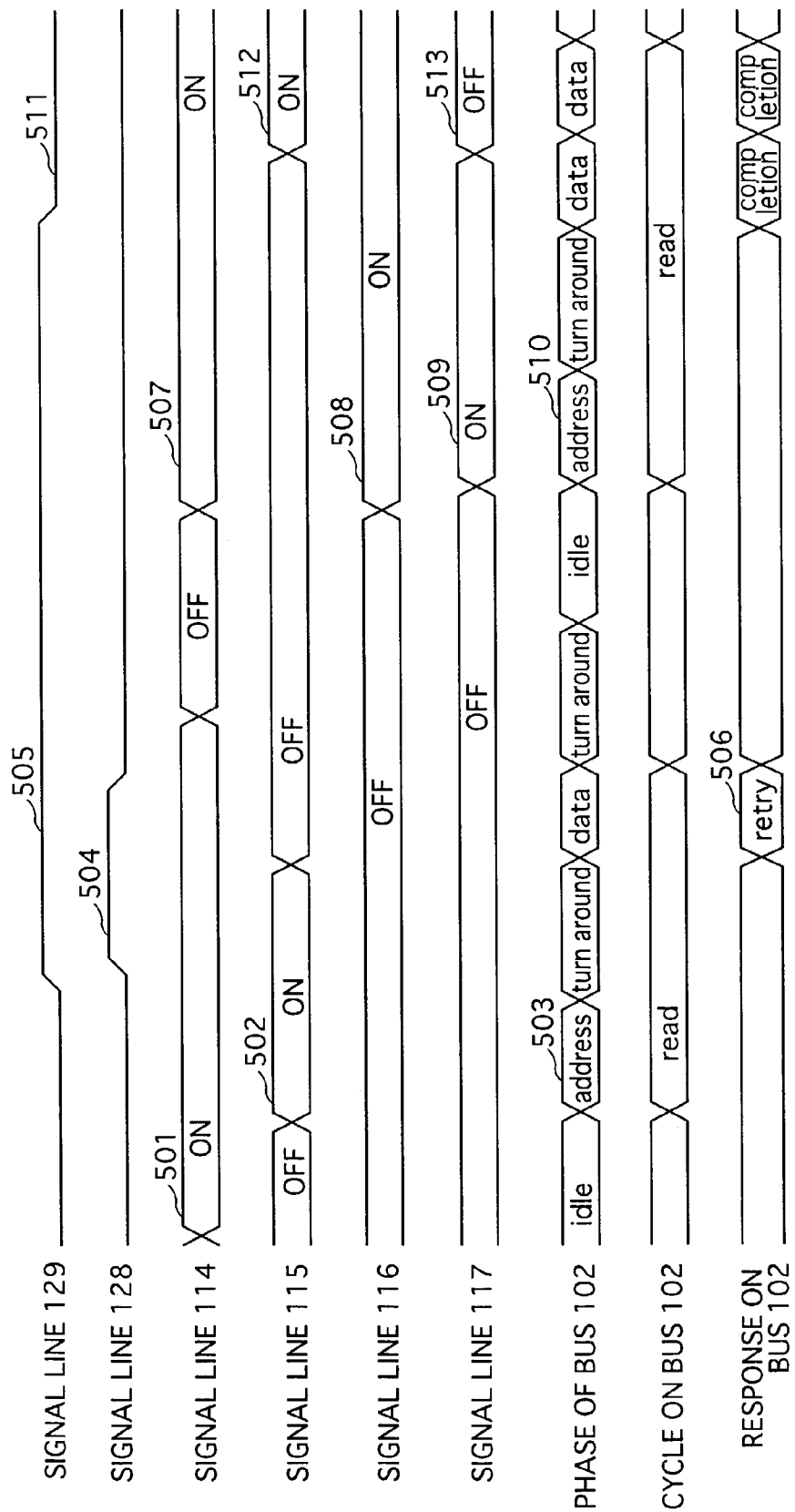
FIG. 9 is part of a time chart of a transaction in which a bus master 108 reads data from a memory 131 in FIG. 6.

FIG. 9 is part of a time chart of a delayed transaction in which the bus master 108 connected to the bus 102 reads data from the memory 131. It is noted once again that the request signal line 114 and the grant signal line 115 are connected with the bus master 108 and the request signal line 116 and the grant signal line 117 are connected with the bus master 109.

First, the bus master 108 asserts the request signal line 114, to request ownership of the bus 102 (501).

Upon detecting the assertion of the request signal line 114, the arbiter 107 performs arbitration.

Since there is no asserted request signal line other than the request signal line 114, the arbiter 107 asserts the grant signal line 115 to grant ownership of the bus 102 to the bus master 108 (502).

Upon detecting the assertion of the grant signal line 115, the bus master 108 initiates a read cycle on the bus 102. The bus interface 105 detects an address of data to be read, during an address phase of the read cycle (503).

The bus interface 105 requests the memory interface 130 to initiate a read cycle to read the data from the detected address.

In the meantime, the CPU 112 is reading data from the memory 131 and therefore the memory access signal line 129 is held asserted (505). Since the memory interface 130 is reading the data from the memory 131 in response to the request from the CPU 112, the memory interface 130 does not accept the request from the bus interface 105.

Since the request to initiate the read cycle is rejected by the memory interface 130, the bus interface 105 asserts the retry response signal line 124 to notify the arbiter 107 of issuance of a retry, and also asserts the memory access signal line 128 (504). The bus interface 105 then issues the retry during a data phase of the read cycle (506).

Upon detecting the assertion of the retry response signal line 124, the arbiter 107 sets the retry information of the bus master 108 to "1", and deasserts the grant signal line 115. Also, upon detecting the assertion of the memory access signal line 128, the arbiter 107 sets the memory access information of the bus master 108, whose retry information is "1", to "1".

After this, the arbiter 107 grants ownership of the bus 102 to the bus interface 105. The bus interface 105 performs bus parking.

Upon receiving the retry during the data phase of the read cycle, the bus master 108 deasserts the request signal line 114 to terminate the read cycle.

After a predetermined period, the bus masters 108 and 109 respectively assert the request signal lines 114 and 116 simultaneously (507 and 508). Upon detecting this, the arbiter 107 performs arbitration with reference to the access information in the access information storing unit 126.

As a result of the arbitration, the arbiter 107 determines to grant ownership of the bus 102 to a device other than the bus master 108, that is, the bus master 109. The arbiter 107 accordingly asserts the grant signal line 117 (509).

Upon detecting the assertion of the grant signal line 117, the bus master 109 initiates a read cycle to read data from the target 110 (510). This read cycle is a burst transfer in which a number of pieces of data are transferred as one group by one addressing operation.

When the read cycle to read from the memory 131 by the CPU 112 ends, the bus interface 104 deasserts the memory access signal line 129 (511).

In response, the arbiter 107 refers to the access information in the access information storing unit 126, and asserts the grant signal line 115 of the bus master 108 whose memory access information is "1" (512). The arbiter 107 simultaneously deasserts the grant signal line 117 of the bus master 109 (513). Having been deprived of ownership of the bus 102, the bus master 109 terminates the read cycle after one clock of data transfer.

Modifications

The bus bridge of the present invention has been described by way of the above embodiments, though it should be obvious that the invention is not limited to the above. Example modifications are given below.

(1) The bus bridge 153 of the second embodiment may be modified so that the memory interface 130 is equipped with a memory controller and a buffer.

Figure 10:
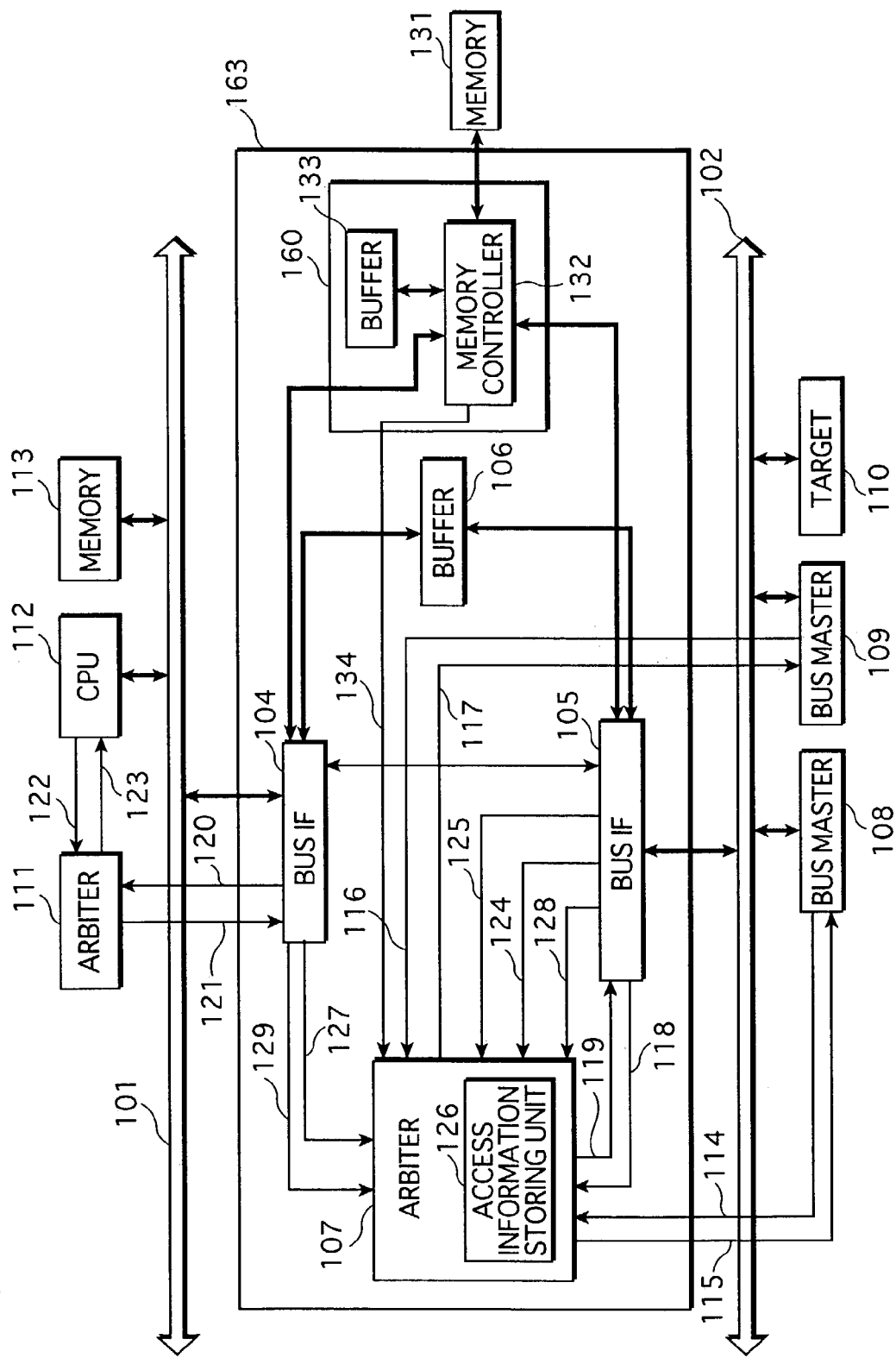
FIG. 10 shows a construction of a bus bridge to which a modification to the second embodiment relates, together with a local memory and two buses that are connected with the bus bridge.
Figure 11:
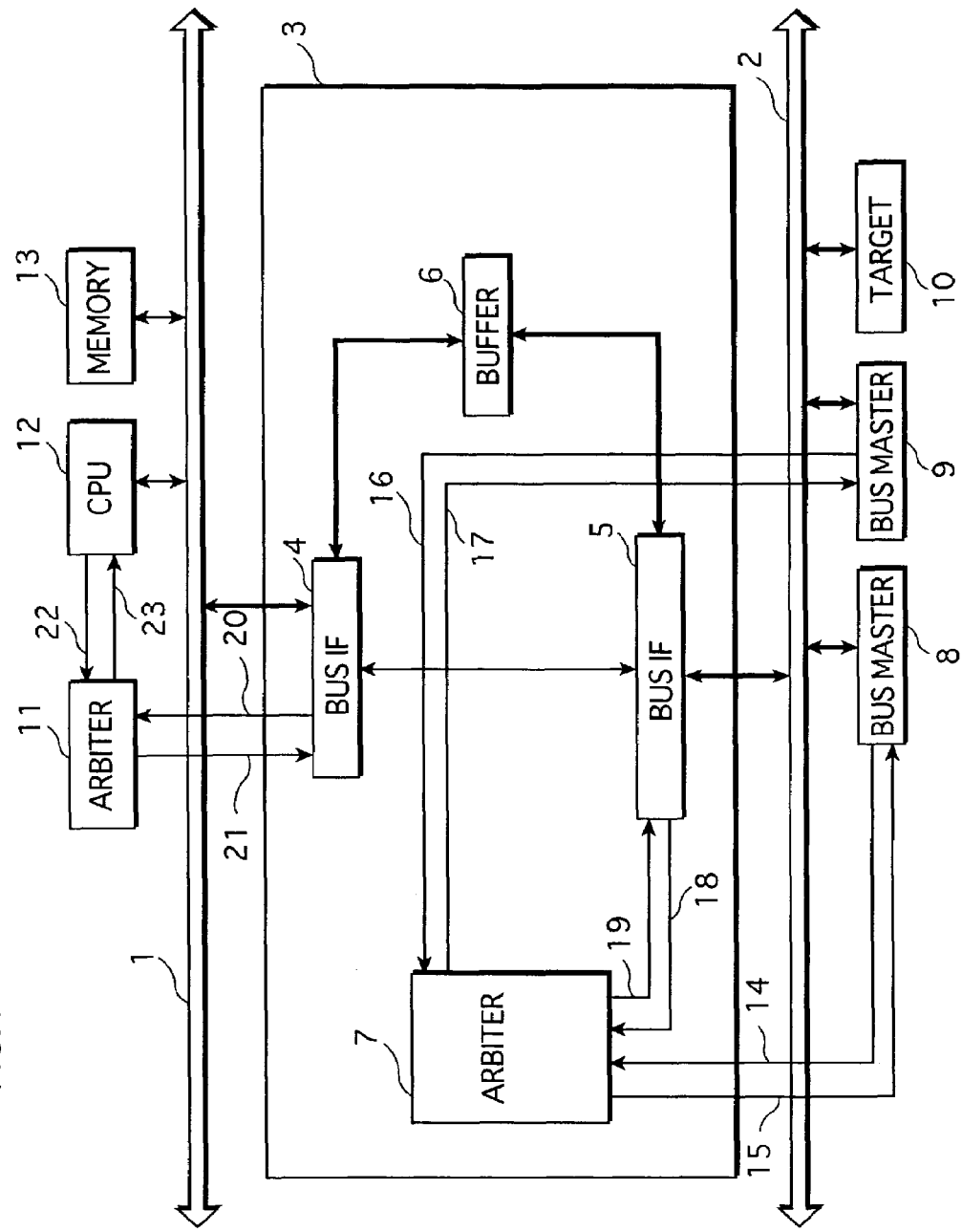
FIG. 11 shows a construction of a conventional bus bridge, together with two buses that are connected with the bus bridge.

FIG. 10 shows a construction of a bus bridge 163 that includes a memory interface 160 having a memory controller 132 and a buffer 133, together with the memory 131 and the two buses 101 and 102 that are connected with the bus bridge 163.

The memory controller 132 is connected with the memory 131 via a local bus. The memory controller 132 receives a request to initiate a bus cycle from the bus interface 104 or 105. If the bus cycle is a read cycle, the memory controller 132 checks whether requested data is stored in the buffer 133. If not, the memory controller 132 reads the data from the memory 131 and stores it into the buffer 133. Once the data has been stored into the buffer 133, the memory controller 132 asserts a transfer completion signal line 134 to notify the arbiter 107 that the data has been stored into the buffer 133.

The buffer 133 is a memory for temporarily storing data read from the memory 131 by the memory controller 132.

A specific operation of this bus bridge 163 is explained below.

Suppose the bus master 108 seeks to read data stored in the memory 131 while the CPU 112 is repeatedly accessing the memory 131. This being the case, the memory controller 132 requests the bus interface 105 to issue a retry to the bus master 108. Having done so, the memory controller 132 reads the data from the memory 131 and stores it into the buffer 133, during the intervals between the repeated accesses to the memory 131 by the CPU 112. Once the data has been accumulated in the buffer 133, the memory controller 132 asserts the transfer completion signal line 134. Upon detecting the assertion of the transfer completion signal line 134, the arbiter 107 sets the transfer completion information of the bus master 108, whose retry information and memory access information are "1", to "1".

The arbiter 107 then asserts the grant signal line 115 of the bus master 108.

In this way, even when the CPU 112 is repeatedly accessing the memory 131, the bus master 108 can read data from the memory 131 speedily.

(2) The above embodiments describe the case when the invention is used for a HOST-PCI bridge, though this is not a limit for the invention, which may be used for any kind of bus bridge that relays data between buses of various standards, such as a PCI-ISA (Industry Standard Architecture) bridge, a PCI-EISA (Extended Industry Standard Architecture) bridge, a PCI-PCI bridge, and a PCI-PCMCIA (Personal Computer Memory Card International Association) bridge.

(3) The invention can also be realized by a computer system that includes an arbiter described in each of the above embodiments. Furthermore, the invention applies to an arbitration method used by the arbiter.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A bus bridge that is connected to a first bus and a second bus, comprising:
an arbiter operable to grant ownership of the first bus to one of a plurality of devices connected to the first bus;
a detecting unit operable to detect a read cycle initiated by the device on the first bus, the read cycle being a cycle to read data stored in a memory which can also be accessed by another device connected to the second bus;
a first signaling unit operable to send a first signal to the arbiter, when the data is not yet transferable to the device at a time when the read cycle is detected;
a second signaling unit operable to send a second signal to the arbiter, when the data becomes transferable to the device,
wherein the arbiter deprives the device of the ownership of the first bus upon receipt of the first signal, and withholds from granting the ownership of the first bus to the device until receipt of the second signal;
a third signaling unit operable to send a third signal to the arbiter, when the transfer of the data to the device is completed,
wherein the arbiter grants the ownership of the first bus to the device upon the receipt of the second signal, and maintains the ownership of the first bus by the device until receipt of the third signal;
wherein the detecting unit includes:
a judging unit operable to judge whether the memory which stores the data to be read is a local memory that is locally connected with the bus bridge, and
the first signaling unit sends the first signal to the arbiter, when the judging unit judges in the affirmative and the data is not yet transferable to the device; and
a buffer operable to temporarily store the data read from the local memory,
wherein the second signaling unit sends the second signal to the arbiter, once the data is stored into the buffer;
wherein the arbiter includes:
a storing unit operable to store status information of each device that is connected to the first bus and can request the ownership of the first bus, and
the arbiter (a) sets a first flag in status information of the device initiating the read cycle and deprives the device of the ownership of the first bus, upon the receipt of the first signal, (b) withholds front granting the ownership of the first bus to the device until the receipt of the second signal, (c) sets a second flag in the status information of the device and grants the ownership of the first bus to the device, upon the receipt of the second signal, and (d) maintains the ownership of the first bus by the device until the receipt of the third signal.

2. The bus bridge of claim 1, further comprising:
a first bus interface operable to act as an interface to the first bus; and
a second bus interface operable to act as an interface to the second bus,
wherein the arbiter and the first bus interface are connected via a first signal line and a third signal line,
the arbiter and the second bus interface are connected via a second signal line,
the first signaling unit is included in the first bus interface, and sends the first signal to the arbiter by asserting the first signal line,
the second signaling unit is included in the second bus interface, and sends the second signal to the arbiter by asserting the second signal line, and
the third signaling unit is included in the first bus interface, and sends the third signal to the arbiter by asserting the third signal line.

3. The bus bridge of claim 1, wherein the arbiter includes:
a storing unit operable to store status information of each device that is connected to the first bus and can request the ownership of the first bus, and
the arbiter (a) sets a first flag in status information of the device initiating the read cycle and deprives the device of the ownership of the first bus, upon the receipt of the first signal, and (b) withholds from granting the ownership of the first bus to the device until the receipt of the second signal.

4. The bus bridge of claim 3, further comprising:
a first bus interface operable to act as an interface to the first bus; and
a second bus interface operable to act as an interface to the second bus,
wherein the arbiter and the first bus interface are connected via a first signal line,
the arbiter and the second bus interface are connected via a second signal line,
the first signaling unit is included in the first bus interface, and sends the first signal to the arbiter by asserting the first signal line, and
the second signaling unit is included in the second bus interface, and sends the second signal to the arbiter by asserting the second signal line.

5. A bus bridge that is connected to a first bus and a second bus, comprising:
an arbiter operable to grant ownership of the first bus to one of a plurality of devices connected to the first bus;
a detecting unit operable to detect a read cycle initiated by the device on the first bus, the read cycle being a cycle to read data stored in a memory which can also be accessed by another device connected to the second bus;
a first signaling unit operable to send a first signal to the arbiter, when the data is not yet transferable to the device at a time when the read cycle is detected;
a second signaling unit operable to send a second signal to the arbiter, when the data becomes transferable to the device, wherein the arbiter includes a storing unit operable to store status information of each device that is connected to the first bus and can request the ownership of the first bus, and the arbiter (a) sets a first flag in status information of the device initiating the read cycle and deprives the ownership of the first bus from the device, upon the receipt of the first signal, and (b) even if the arbiter receives the ownership request, withholds from granting the ownership of the first bus to the device until the receipt of the second signal;
a first bus interface operable to act as an interface to the first bus; and
a second bus interface operable to act as an interface to the second bus,
wherein the arbiter and the first bus interface are connected via a first signal line,
the arbiter and the second bus interface are connected via a second signal line,
the first signaling unit is included in the first bus interface, and sends the first signal to the arbiter by asserting the first signal line, and
the second signaling unit is included in the second bus interface, and sends the second signal to the arbiter by asserting the second signal line.

* * * * *